United States Patent
Schuldenberg et al.

[11] 3,944,636
[45] Mar. 16, 1976

[54] COOLING TOWER
[75] Inventors: Franz J. Schuldenberg; Hans-Bernd Gerz, both of Bochum, Germany
[73] Assignee: GEA Luftkuehlergesellschaft Happel GmbH & Co. KG, Bochum, Germany
[22] Filed: May 14, 1975
[21] Appl. No.: 577,426

[30] Foreign Application Priority Data
May 17, 1974 Germany.......................... 2424059

[52] U.S. Cl. ......... 261/159; 261/109; 261/DIG. 11; 261/DIG. 77; 165/129
[51] Int. Cl.² ........................ F28C 1/06; F28D 5/00
[58] Field of Search............ 261/DIG. 11, 109, 64 R, 261/158–161, 111, DIG. 77; 165/129

[56] References Cited
UNITED STATES PATENTS

| | | |
|---|---|---|
| 3,400,917 | 9/1968 | Richards ..................... 261/DIG. 11 |
| 3,411,758 | 11/1968 | Edmondson ................. 261/DIG. 11 |
| 3,422,883 | 1/1969 | Daltry ......................... 261/DIG. 11 |
| 3,776,306 | 12/1973 | Michel ........................ 165/129 |
| 3,844,344 | 10/1974 | Kliemann et al............. 261/DIG. 11 |
| 3,846,519 | 11/1974 | Spangemacher.............. 261/109 |

Primary Examiner—Tim R. Miles
Assistant Examiner—Gregory N. Clements
Attorney, Agent, or Firm—Michael J. Striker

[57] ABSTRACT

A cooling tower has circumferentially distributed inlet openings at the lower end for the entrance of cooling air and a central upper outlet opening. Cooling air flows through the tower, on the one hand, countercurrently to a medium to be cooled which flows in downward direction over a trickling unit (wet cooling section), and on the other hand, parallel thereto about heat-exchanger elements, flown through by a medium to be cooled (dry cooling section). The trickling unit and the heat-exchanger elements are separated from each other.

11 Claims, 3 Drawing Figures

COOLING TOWER

BACKGROUND OF THE INVENTION

The present invention relates to a cooling tower having circumferentially distributed inlet openings at the lower end for the entrance of cooling air and a central upper outlet opening, through which cooling air flows, on the one hand, countercurrently to a medium to be cooled with flows in downward direction over a trickling unit (wet cooling section), and on the other hand, parallel thereto about heat-exchanger elements, flown through by a medium to be cooled (dry cooling section), and in which the trickling unit and the heat-exchanger elements are separated from each other.

In a known cooling tower construction of the aforementioned kind, the wet cooling section and the dry cooling section are divided in a plurality of V-shaped sectors, as considered in horizontal cross section of the cooling tower, with the sectors of the wet cooling section alternating with those of the dry cooling section in circumferential direction of the tower. Separating walls between the alternating, successive sectors of the wet cooling section and the dry cooling section create passages, which diminish in cross section toward the central axis of the tower, through which the cooling air passes. Each sector of the wet cooling section is provided with a radially extending main channel and with normally thereto arranged auxiliary channels from which the medium to be cooled, in this case water, flows through openings in the bottom of the channels downwardly over trickling units in countercurrent to the upwardly flowing cooling air. The radial main channels and the normally arranged auxiliary channels extend nearly over the total horizontal cross section of each V-shaped sector of the wet cooling section. A collecting reservoir for the water is provided at the bottom of these sectors.

The sectors for the dry cooling section have channels of substantially open cross section which are only at the circumference of the tower provided with substantially vertically extending heat-exchanger elements. The updraft for the cooling air for the wet cooling section as well as for the dry cooling section is produced by a ventilator arranged above the aforementioned sectors on a central column.

An essential disadvantage of this known construction consists in that the heat-exchanger elements of the dry cooling section are arranged on the circumference of the cooling tower. Such an arrangement will be susceptible to the influence of wind passsing around the cooling tower since during passing of wind around the cooling tower a greatly varying pressure profile will be formed on the circumference of the tower. The influence of the wind passing around the cooling tower is further increased by the radial separating walls between the sectors of the wet cooling section and the dry cooling section. Such separating walls are, however, absolutely necessary in this known cooling tower construction since otherwise the cooling surfaces of the dry cooling section may be wetted with contaminated water. In addition, the necessary radial separating walls evidently increase the production costs of such a cooling water considerably.

In this known construction it is also necessary to provide separate air inlet openings for the sectors of the wet cooling section as well as for the sectors of the dry cooling section. Such different air inlet openings are difficult to realize constructively and this is an additional considerable disadvantage of the known cooling tower construction. Furthermore, due to the alternating arrangement of sectors for the wet cooling section and sectors for the dry cooling section, the arrangement of the necessary conduits, especially for the dry cooling section, will be complicated and expensive. In addition, the collecting container for the water to be cooled in the wet cooling section will necessarily extend substantially over the whole cross section of the cooling tower, which likewise increases its production costs.

SUMMARY OF THE INVENTION

It is an object of the present invention to provide a cooling tower with a wet cooling section and a dry cooling section which overcomes the above described disadvantages of such cooling towers known in the art.

It is a further object of the present invention to provide a cooling tower of the aforementioned kind having a wet cooling section and a dry cooling section over which the cooling air flows in parallel streams, which can be manufactured at a considerably lower cost than the above described cooling tower known in the art.

It is a further object of the present invention to provide a cooling tower of the aforementioned kind with an improved operating characteristic and in which formation of vapor clouds emanating from the tower is substantially prevented.

With these and other objects in view, which will become apparent as the description proceeds, the cooling tower according to the present invention having an upper open outlet end and a plurality of air inlet openings at the lower end thereof, is provided with a central cooling shaft coaxially arranged within the cooling tower and defining between its outer surface and the inner surface of the cooling tower an annular space in which a plurality of radially extending heat-exchanger elements are provided in a plurality of concentric rings in a substantially bowl-shaped arrangement starting above the air inlet openings in the cooling tower and gradually sloping downwardly toward the central cooling shaft, whereas a trickling unit is arranged extending transverse through the central shaft over which a medium to be cooled is adapted to flow in downward direction so that cooling air will flow in one stream countercurrently to the flow of the medium to be cooled over the trickling unit and in an other stream parallel thereto over the heat-exchanger elements.

The construction of the present invention has the advantage that no heat-exchanger elements are provided directly at the circumference of the cooling tower so that the greatly different pressure profile around the cooling tower during passage of winds about the same will have no influence on the performance of the heat-exchanger elements. The cooling air can enter freely in radial direction through the air inlet openings provided circumferentially at the lower end of the cooling tower and the cooling air passes without hindrance to the heat-exchanger elements arranged in the annular space between the central cooling shaft and the tower as well as to the inlet openings of the central cooling shaft. Thereby the reduction of the cross section of the passage for the inflowing cooling air beneath the bowl-shaped, toward the center of the cooling tower inclined arrangement of the heat-exchanger elements will be advantageous for the uniform impingement of cooling air onto the heat-exchanger elements.

Separating walls for separately guiding the air to wet cooling sectors or dry cooling sectors become unnecessary, which evidently considerably reduces the production cost of the cooling tower according to the present invention.

The central arrangement of the wet cooling shaft makes it also possible to arrange the collecting container only in the central cooling shaft below the trickling unit therein. This will likewise reduce the production cost of the cooling tower. According to the present invention, it is also possible to arrange the trickling unit in the central cooling shaft at an optimum height. An influence of the wet cooling section onto the dry section is thereby avoided. The necessary support construction for the trickling unit can be thereby reduced and in addition the height to which the medium to be passed over the trickling unit has to be pumped can likewise be lowered.

The heat-exchanger elements in the dry cooling section are preferably roof shaped with conduits provided with cooling ribs. The radial arrangement of the heat-exchanger elements in individual concentric rings and the bowl-shaped, toward the central axis of the cooling tower declining, arrangement of the rings will assure an efficient use of the available room in the tower and therewith an especially high efficiency.

Due to the concentric arrangement of the wet cooling section and the dry cooling section, the moisture laden warm air from the wet cooling section will be surrounded by a layer of dry warm air. This will assure that formation of vapor clouds at the outlet end of the cooling tower will be positively prevented, an advantage derivable from cooling towers of the known art only during favorable weather conditions, that is, at elevated outer temperatures and a relatively low air humidity. Since in the arrangement according to the present invention a greater volume of air passes through the dry cooling section and this air passing through the dry cooling section will surround the air passing through the wet cooling section the formation of vapor clouds will be positively prevented independent of the season.

An especially advantageous arrangement according to the present invention is obtained by arranging the trickling unit in the central cooling shaft at an elevation at which the inner, that is the lowest heat-exchanger element ring is arranged. This will assure an advantageous location of the trickling unit without influencing the dry cooling section and which, as mentioned above, reduces also the support construction for the trickling unit and the height to which the medium to be cooled has to be pumped.

A further feature of the present invention consists of providing a ventilator rotatable about a vertical axis above the trickling unit in the central wet cooling shaft to thereby increase the updraft of the air passing through the cooling tower. The additional advantages derivable from such an arrangement is that the air streams which pass upwardly through the wet cooling section and the dry cooling section are intensively mixed with each other which further reduces the possibility of any cloud formations at the upper end of the cooling tower. The use of such a ventilator will assure further that the dimension of the wet cooling section may be reduced while producing the same cooling effect. The provision of a ventilator will additionally provide for any desired regulation during change of the heat load between the wet cooling section and the dry cooling section.

The invention is, of course, not limited to the arrangement of a single ventilator in the wet cooling shaft, but in accordance with the use of the cooling tower it can be advantageous to provide two or more ventilators rotating about vertical axes in the wet cooling shaft.

According to a further feature of the present invention, the upper outlet opening of the central wet cooling shaft is arranged above the air inlet openings in the wall of the cooling tower. This will further increase mixing of the warm air streams passing upwardly through the wet cooling section and the dry cooling section. The mixing of the dry air stream with the air stream saturated with humidity is further improved by gradually increasing the cross-section of the central wet cooling shaft toward the upper outlet opening thereof. In this way, the wall of the outer cooling tower and that of the wet cooling shaft are curved in opposite directions to assure thereby that the air streams passing therethrough will cross each other.

The intimate mixing of the warm air streams emanating from the wet cooling section and the dry cooling section can be further improved by providing air guide means in the region of the upper open end of the cooling shaft for imparting to the stream of air passing therethrough an outwardly curving movement.

Depending on the season of the year and also dependent on the amount and the temperature of the medium to be cooled, whereby for instance in the wet cooling section another medium may be cooled than in the dry cooling section, it may be advantageous, in order to obtain the best heat exchange effect, to vary the cooling effect obtainable from the dry cooling section and the wet cooling section. For this purpose, a plurality of openings which are closeable by louvres are provided in a preferred arrangement according to the present invention in the region between the trickling unit and the ventilator or ventilators arranged above the same and it is further advantageous to provide such louvres at the inlet openings provided at the lower end of the central cooling shaft so that these air inlet openings for the central cooling shaft may be closed by such louvres.

During parallel operation of the wet cooling section and the dry cooling section, the louvres in the region between the ventilator, respectively ventilators, and the trickling unit are closed and the louvres in the air inlet openings of the central shaft below the trickling unit are opened. If the louvres at the air inlet opening of the central shaft are closed and the louvres in the wall of the central shaft between the trickling unit and the ventilator, respectively the ventilators, are opened, then the cooling tower may be operated strictly as dry cooling tower. By arranging the elevation of the ventilator, or the ventilators, above the trickling units, that is above at least the inner, i.e., the lowest of the heat-exchanger element rings it is possible to expedite a part of the already warmed-up air of the dry cooling section to thus support the updraft of the warmed air. Of course during such use, feeding of the medium to be cooled to the trickling unit has to be interrupted. The warmed-up air located above the inner heat-exchanger elements of the dry cooling section is drawn by the ventilator or ventilators in part through the upper open louvres into the central cooling shaft and thereby accelerated. Due to the withdrawal of warm air from above the heat-exchanger elements, the updraft of the total air stream is accelerated so that the flow of air to the heat-exchanger elements is increased and the heat exchange thus produced is considerably improved.

According to a further feature of the present invention, the median diameter of the central shaft is about a third to a sixth of the diameter of the cooling tower in the region of the air inlet openings of the latter.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENT

Figure 1:
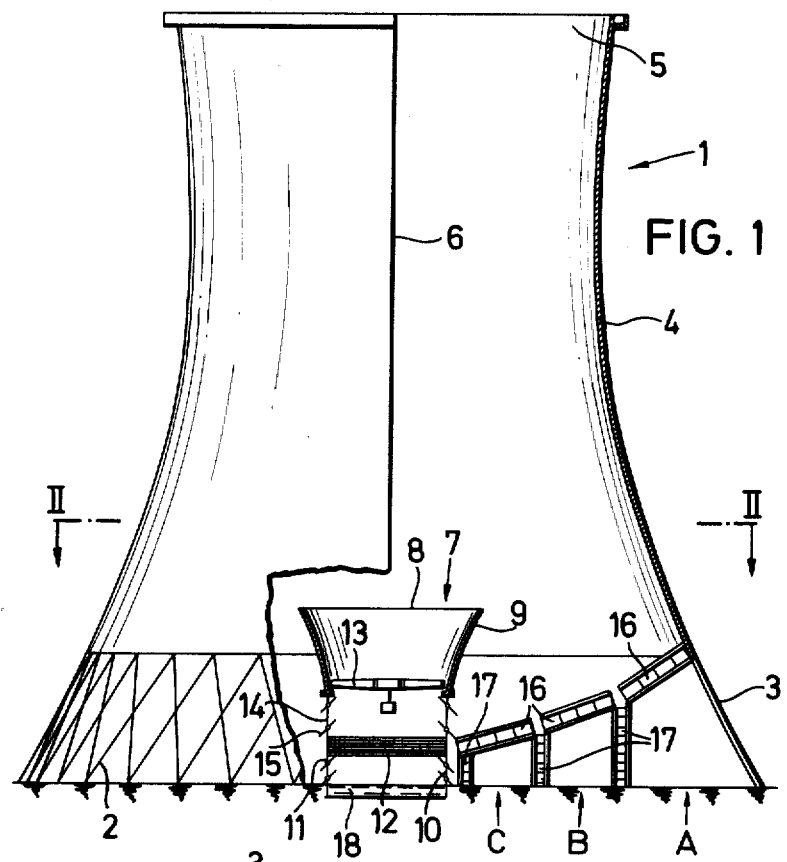
FIG. 1 is a partial cross-sectioned side view of the cooling tower arrangement according to the present invention.
Figure 2:
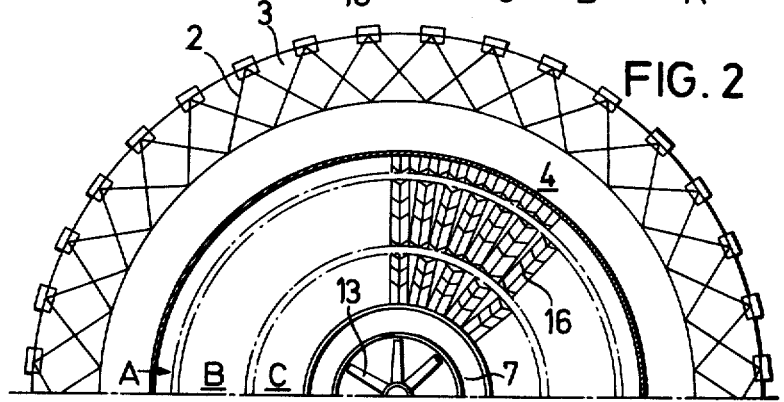
FIG. 2 is a horizontal cross-section through half of the cooling tower taken along line II—II of FIG. 1, as viewed in the direction of the arrow.

The cooling tower arrangement according to the present invention, which is only schematically illustrated in FIGS. 1 and 2, comprises a cooling tower 1 of known cross-section which is preferably constructed from reinforced concrete. The cooling tower 1 is over a major part of its height closed in circumferential direction and provided only in the region of its lower end with a support construction 2 which forms a plurality of air inlet openings 3 in the wall 4 of the cooling tower through which cooling air may enter in radial direction into the interior of the cooling tower. The cooling air entering the cooling tower will be warmed up, as will be pointed out in the following description, and passes in upward direction through the cooling tower to leave the latter through an upper central outlet opening 5.

Coaxially arranged with the longitudinal axis 6 of the cooling tower is a central wet cooling shaft 7. The height of the shaft 7 is so dimensioned that its upper outlet opening 8 is arranged at a level above the upper ends of the air inlet openings 3 provided in the cooling tower.

The central shaft 7 may likewise be constructed from reinforced concrete, but other material may also be used for its construction. The wall 9 of the central shaft 7 is provided in the lower region thereof with openings 10 which may be closed by louvres located at this region. A trickling unit 12 of known, and therefore not detailedly described, construction extends transversely through the open cross-section of the central shaft 7 above the openings 10 and the medium to be cooled is supplied by conduits, not shown, to trickle downwardly over the trickling unit 12 in countercurrent direction to the cooling air passing laterally through the openings 10 and upwardly through the central cooling shaft.

A ventilator 13 rotatable about a vertical axis is arranged upwardly spaced from the trickling unit 12 and the outer diameter of the ventilator is only slightly smaller than the inner diameter of the central shaft 7 in the region at which the ventilator is arranged.

The wall 9 of the shaft 7 is additionally provided with openings 14 in the region between the ventilator 13 and the trickling unit 12, and louvres 15 are arranged also in the openings 14 so that the latter may be closed if desired. In FIG. 1 the louvres 11 as well as the louvres 15 are shown in open position. The louvres 11 as well as the louvres 15 may be moved from the open to the closed position by actuating means well known in the art and not illustrated in the drawing in order not to complicate the drawing unnecessarily.

The vertical cross-section of the central shaft 7 is dimensioned in such a manner that it increases gradually towards the upper outlet end thereof.

The heat-exchanger elements 16 of the dry cooling section of the cooling tower arrangement are located in the annular space between the wall 4 of the cooling tower and the central shaft 7. Each of the heat-exchanger elements 16 is in substantially gable roof form with the two sides of the cooling element formed by inclined conduits provided with cooling ribs These conduits are at the head and foot ends connected with each other by distributing, respectively, collecting chambers. The cooling elements 16 are substantially radially arranged in three concentric rings A, B and C, and the conduits for feeding the medium to be cooled into the cooling elements 16 are not shown in the drawing.

The three concentric rings A, B, C are mounted in a substantially bowl-shaped, towards the central axis 6 inclined, arrangement. The outer ends of the heat-exchanger elements 16 in the outer ring A are thereby located above the inlet openings 3 for the cooling air provided in the wall 4 of the cooling tower. The heat-exchanger elements of the three rings are mounted on supports 17. The conduits for feeding the medium to be cooled and for discharging the medium from the heat-exchanger elements may be mounted on the supports 17 and the conduit for feeding the medium to be cooled to the upper ends of the heat-exchanger elements 16 of the outer ring A may be supported on the wall 4 of the cooling tower. On the other hand, the collecting chamber of the outermost ring A may be directly connected to the distributing chamber of the heat-exchanger elements in the ring B and the collecting chamber of the latter may be connected to the distributing chamber of the innermost ring C while the conduit for discharging the cooled medium from the collecting chamber of the ring C would then be supported on the innermost of the support 17. The cooling medium discharged from the inner ring C may then be passed over the trickling unit 12 in the central shaft 7, but on the other hand, it is also possible to feed different mediums to be cooled through the heat-exchanger elements 16 and over the trickling unit 12.

The above described cooling tower arrangement may be operated in two different ways. By closing the louvres 15 in the central shaft 7 above the trickling unit 12, cooling air will pass upwardly between the heat-exchanger elements 16 due to the natural draft provided by the cooling tower and at the same time cooling air will be forced upwardly through the trickling unit 12, when the louvres 11 are in the open position, by the ventilator 13 arranged above the trickling unit 12 in the central shaft. On the other hand, depending on the season of the year, respectively depending on the amount and the temperature of the medium to be cooled, it is also possible to close the louvres 11 located below the trickling unit 12 while keeping the louvres 15 above the trickling unit 12 in open position so that only the dry section of the cooling tower will be in operation. If during such operation the ventilator 13 is kept running, then the warmed-up air above the heat-exchanger elements is at least in the region of the inner ring C sucked partly through the openings 14 by the ventilator 13 so that an accelerated updraft of air and therewith improved heat exchange is obtained. Of course, it is also possible to close or open the louvres 11 and 15 to a varying degree to vary thereby the cooling effect provided by the wet cooling section, respectively the dry cooling section, in any desired manner.

It is also possible to provide the heat-exchanger elements 16 with adjustable louvres to vary impingement of the cooling air on the heat-exchanger elements in any desired manner.

A collecting container 18 for collecting the medium trickling downwardly over the trickling unit 12 is provided at the bottom of the central shaft 7 from which the cooling medium may be discharged through a conduit, not shown in FIG. 1, in which a pump may be arranged for pumping the cooled medium to any desired location.

Figure 3:
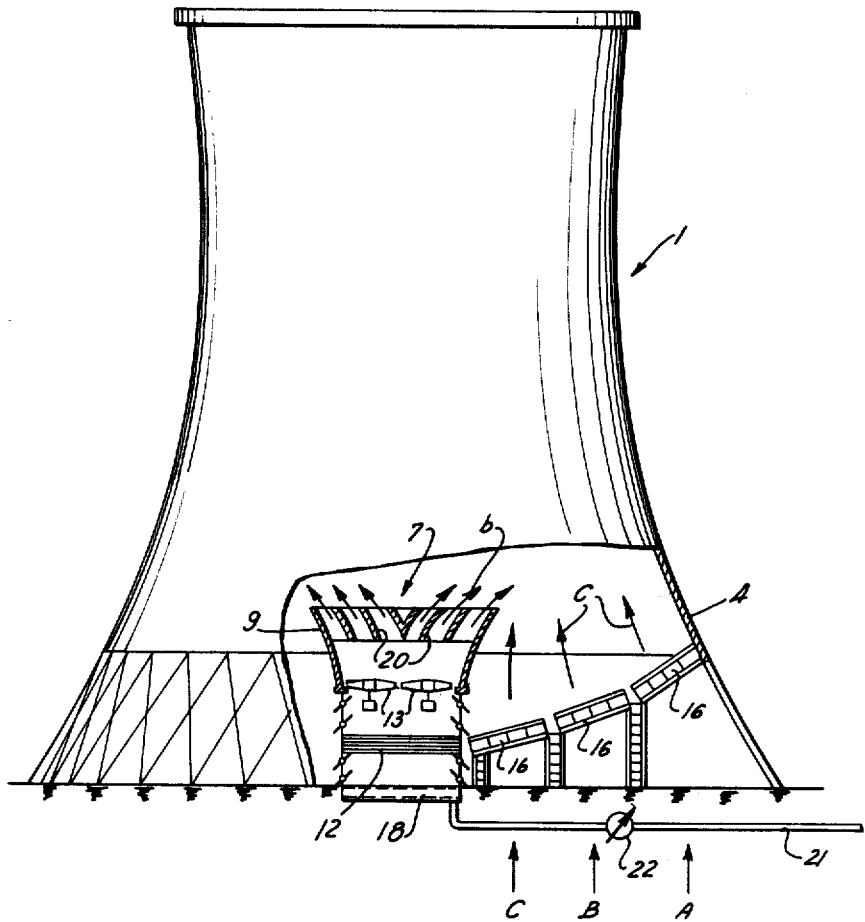
FIG. 3 is a view similar to FIG. 1 and showing a modified arrangement.

FIG. 3 illustrates in a partly sectioned side view a modification of the above described cooling tower arrangement.

The modification illustrated in FIG. 3 differs from the above described arrangement in that two ventilators 13, rotatable about vertical axes, are arranged in the central shaft 7. This central shaft 7 is further provided at its upper outlet end with annular or spirally arranged outwardly curving air guide vanes 20 so as to deflect the air stream passing therebetween in outward direction as indicated by the arrow b, so that the air stream forced upwardly by the ventilators 13 through the central shaft will cross the air stream passing in the direction as indicatd by the arrow c upwardly in the annular space between the wall 4 of the cooling tower 1 and the wall 9 of the central shaft 7, whereby the moisture laden air stream passing through the central shaft 7 is thoroughly mixed with the substantially dry air stream passing through the annular space between the walls 4 and 9.

FIG. 3 also schematically illustrates the conduit 21 for discharging the cooled medium from the collecting container 18 and a pump 22 located in the conduit 21 for pumping the cooled medium to any desired location.

It will be understood that each of the elements described above, or two or more together, may also find a useful application in other types of cooling tower arrangement differing from the types described above.

While the invention has been illustrated and described as embodied in a cooling tower arrangement provided with a central cooling shaft, it is not intended to be limited to the details shown, since various modifications and structural changes may be made without departing in any way from the spirt of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A cooling tower arrangement comprising a cooling tower having an upper open end and a plurality of air inlet openings at the lower end; a central cooling shaft coaxially arranged within the cooling tower and defining between its outer surface and the inner surface of the cooling tower an annular space, said cooling shaft having an upper open end and a plurality of inlet openings at the lower end thereof; a plurality of heat-exchanger elements to be flown through by a medium to be cooled being arranged in said annular space in a plurality of concentric rings and extending in each ring in substantially radial direction and downwardly inclined toward said central shaft with the radially outermost ends of the heat-exchanger elements in the outermost ring located above said air inlet openings in the tower and with the radially innermost ends of the heat-exchanger elements of the innermost ring located at the inlet openings of the shaft so that the plurality of said heat-exchanger elements form a bowl-shaped arrangement in said annular space curving downwardly towards said shaft; and a trickling unit extending transverse through said central shaft in the region of said inlet openings therein over which a medium to be cooled is adapted to flow in downward direction so that cooling air will flow in one stream countercurrently to the flow of the medium to be cooled over said trickling unit and in an outer stream parallel to said one stream over said heat-exchanger elements.

2. A cooling tower arrangement as defined in claim 1, wherein said trickling unit is arranged at an elevation substantially equal to that of the heat-exchanger elements in the innermost ring.

3. A cooling tower arrangement as defined in claim 1, and including a ventilator rotatable about a vertical axis in said central cooling shaft above said trickling unit therein.

4. A cooling tower arrangement as defined in claim 1, and including at least two ventilators arranged rotatable about vertical axes in said central cooling shaft above said trickling unit therein.

5. A cooling tower arrangement as defined in claim 1, wherein the upper open end of said central cooling shaft is located at a higher elevation than the air inlet openings of the cooling tower.

6. A cooling tower arrangement as defined in claim 1, wherein the open cross-section of said central cooling shaft increases towards the upper open end thereof.

7. A cooling tower arrangement as defined in claim 1, and including air guide means in the region of the upper open end of said central shaft for imparting to the stream of cooling air passing therethrough an outwardly inclined direction to intimately mix the moisture laden air emanating from said cooling shaft with the substantially dry air passing upwardly through said annular space.

8. A cooling tower arrangement as defined in claim 3, wherein said central cooling shaft is provided in the region between said trickling unit and said ventilator with openings, and including louvres in said openings movable between an open and a closed position.

9. A cooling tower arrangement as defined in claim 1, and including louvres in said air inlet openings at the lower end of said central cooling shaft movable between an open and a closed position.

10. A cooling tower arrangement as defined in claim 1, wherein the median inner diameter of said central cooling shaft is about one-third to one-sixth of the inner diameter of the tower in the region of the air inlet openings of the latter.

11. A cooling tower arrangement as defined in claim 1, and including a liquid collecting container at the bottom of said central cooling shaft.

* * * * *